March 28, 1939. J. G. BAKER 2,151,728
MEASURING AND RECORDING DEVICE FOR DEEP WELL PUMPS
Filed April 16, 1936 6 Sheets-Sheet 3
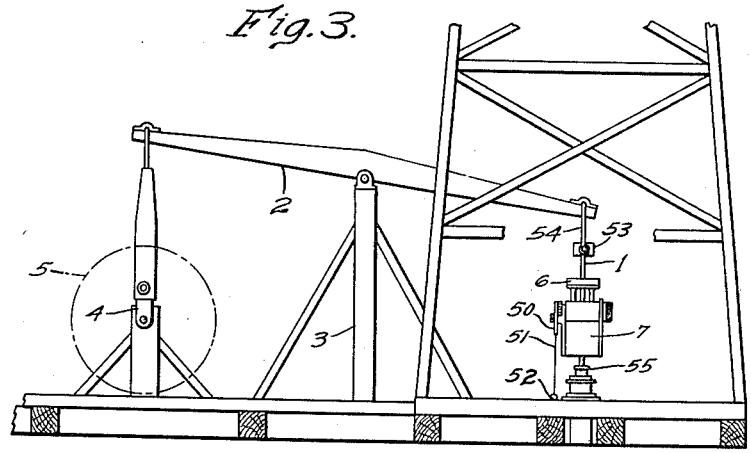
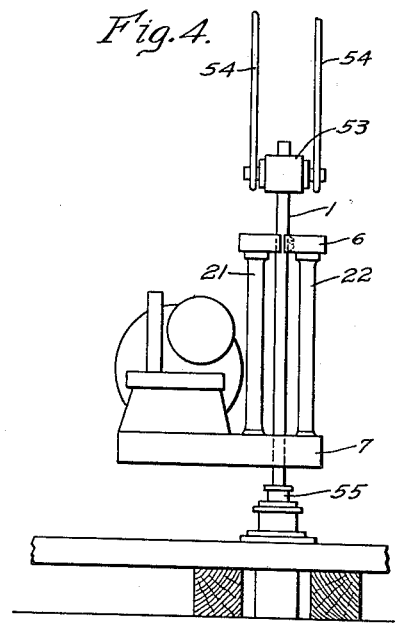
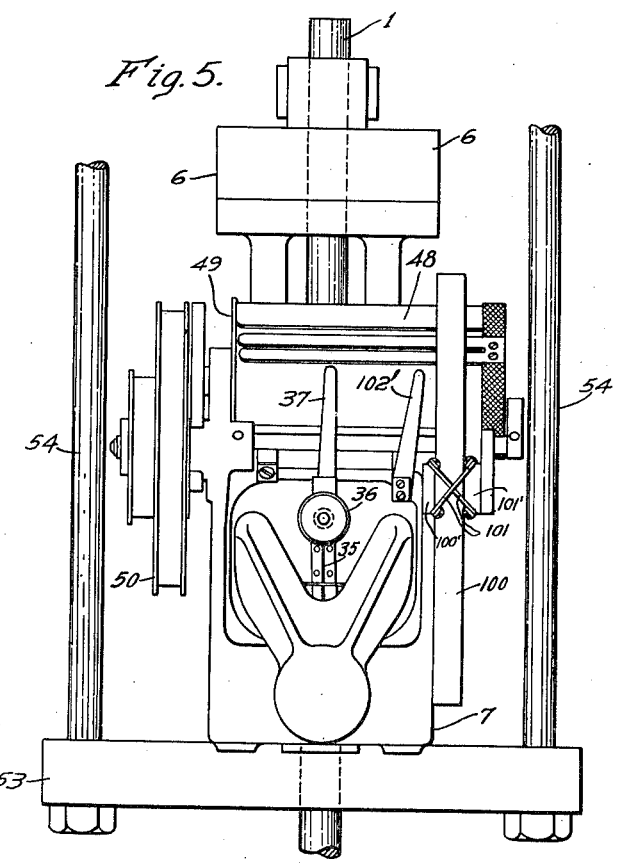
INVENTOR
John G. Baker.
BY
Paul E. Friedemann
ATTORNEY March 28, 1939. J. G. BAKER 2,151,728
MEASURING AND RECORDING DEVICE FOR DEEP WELL PUMPS
Filed April 16, 1936 6 Sheets-Sheet 4
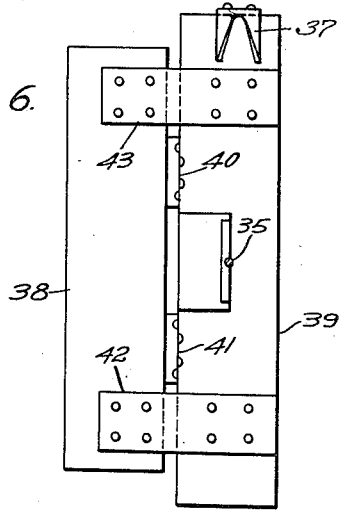
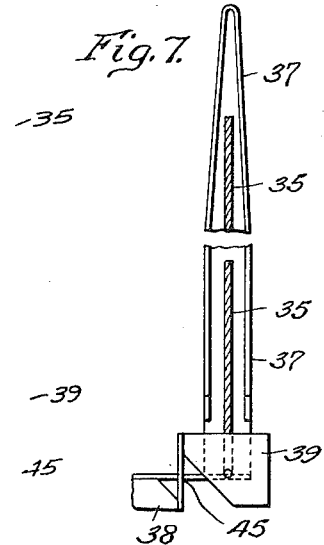
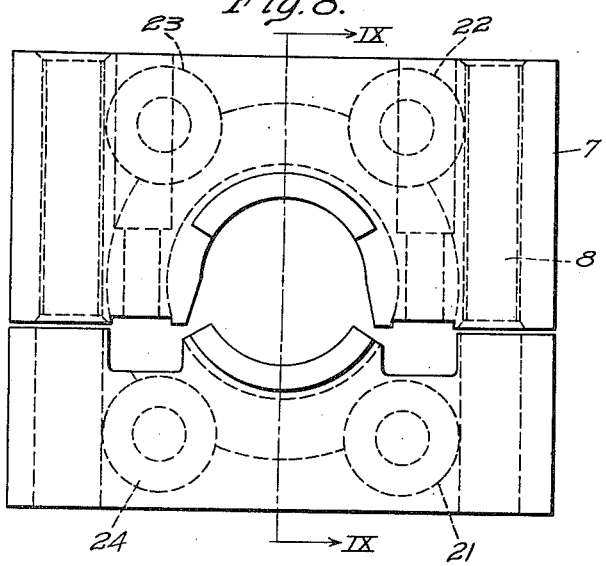
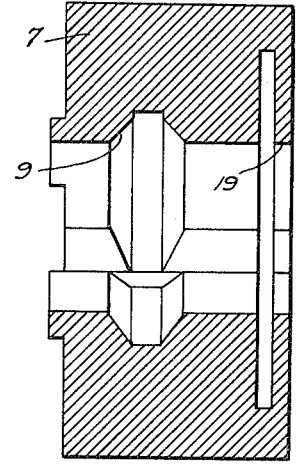
INVENTOR
John G. Baker.
BY Paul E. Friedemann
ATTORNEY March 28, 1939.   J. G. BAKER   2,151,728
MEASURING AND RECORDING DEVICE FOR DEEP WELL PUMPS
Filed April 16, 1936   6 Sheets-Sheet 5
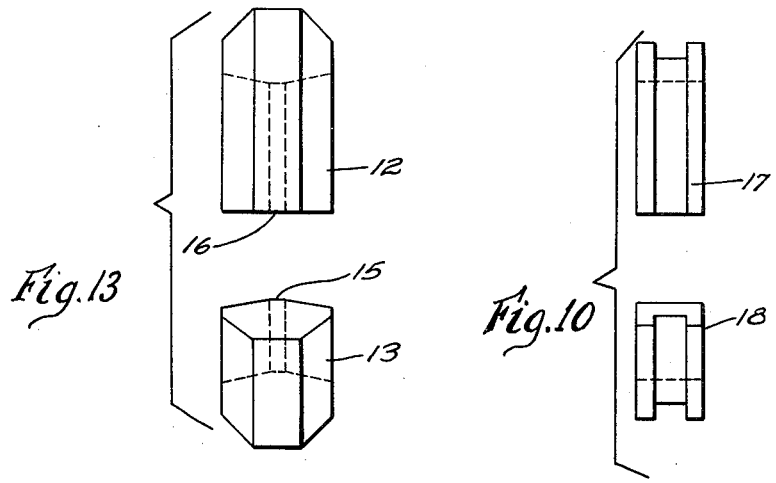
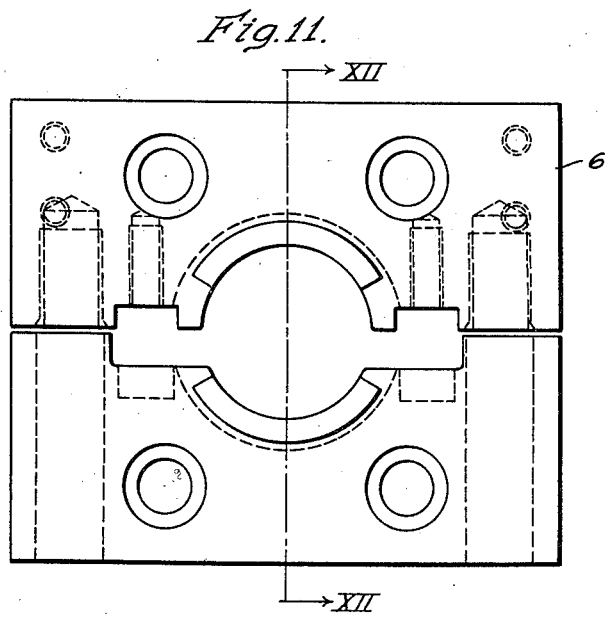
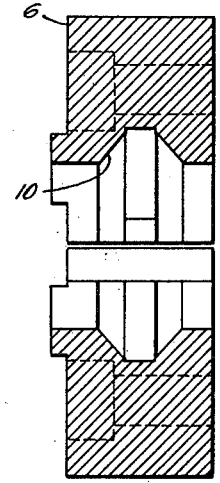
WITNESSES:
INVENTOR
John G. Baker.
BY
Paul E. Friedemann
ATTORNEY Patented Mar. 28, 1939

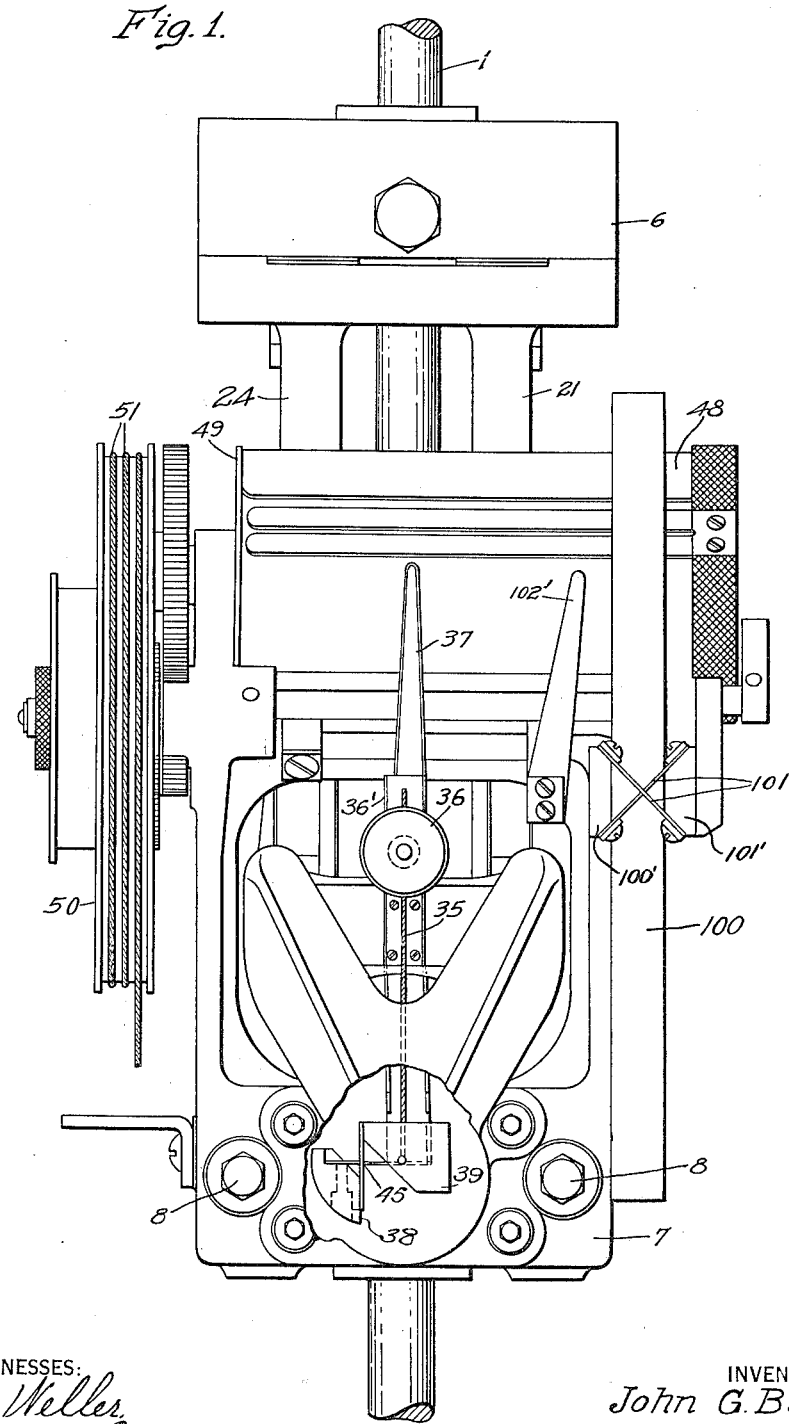

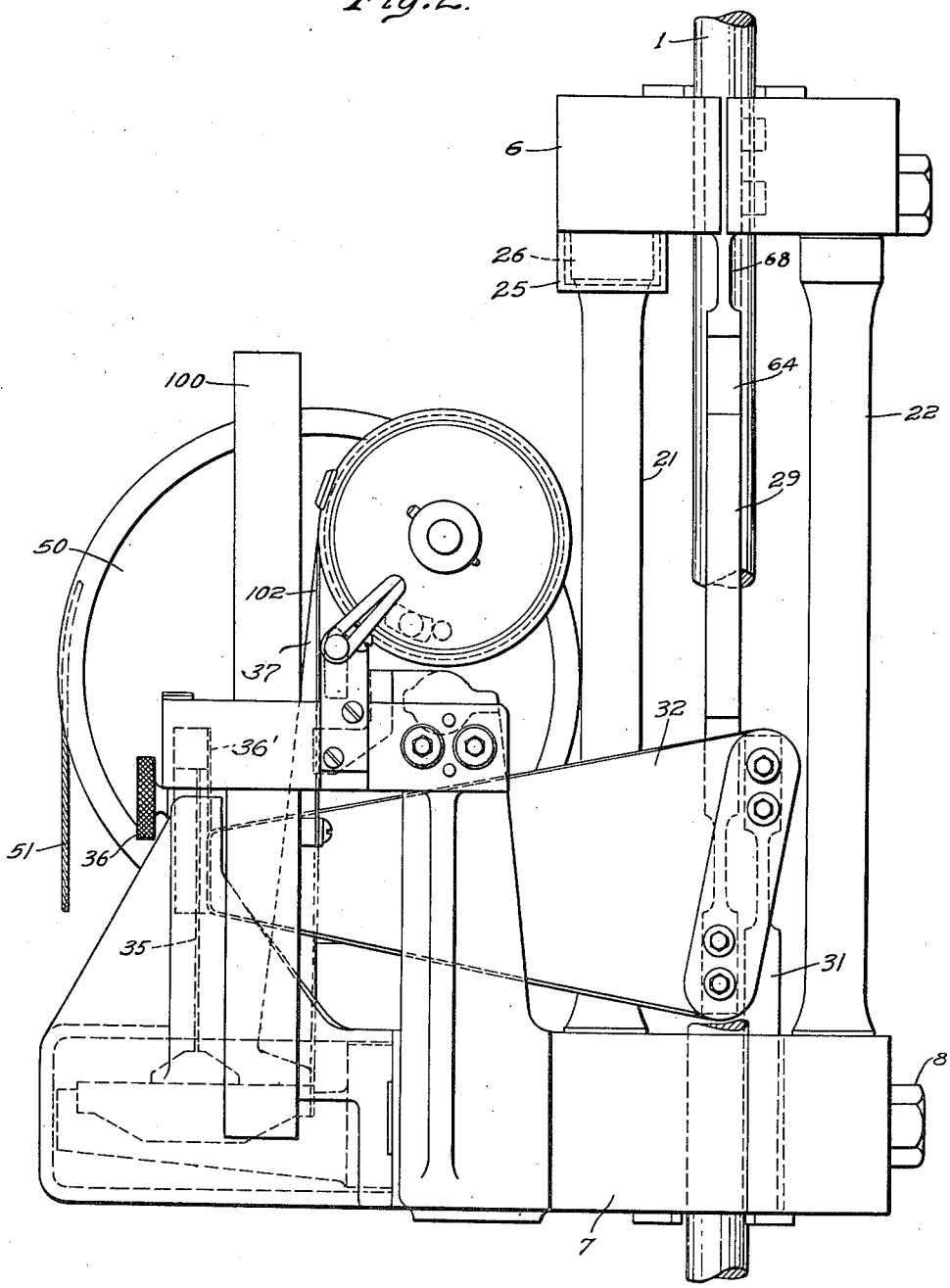

2,151,728

UNITED STATES PATENT OFFICE 2,151,728

MEASURING AND RECORDING DEVICE FOR DEEP WELL PUMPS

John G. Baker, Pittsburgh, Pa., assignor to Westinghouse Electric & Manufacturing Company, East Pittsburgh, Pa., a corporation of Pennsylvania Application April 16, 1936, Serial No. 74,741

9 Claims. (Cl. 265—2)

My invention relates to force-measuring devices, more particularly to devices for measuring and recording the stress in pumping rods for deep well pumps.

In the oil industry it is often desirable to know the loads that are produced in the pumping rod, namely the polish rod, of a pump being operated from the walking beam. Force measuring devices of various kinds are, of course, well known. However, the polish rod is a moving rod and subjected to bending.

One object of my invention is to provide a mechanism for indicating and recording the forces occurring in a polish rod or pumping rod, which measurement is independent of any bending, twisting, or lateral distortion that may be produced in the rod during the pumping operation.

A broader object of my invention is to measure the deformation in a member under varying tension by measuring deformation of a specific length of the member under such tension.

Another broad object of my invention is to measure the stresses in a tension member independent of any torsional forces or bending forces acting on the tension member.

A more specific object is to measure the variations in stress produced in the polish rod for one complete cycle of its operation during the pumping operation.

Other objects and advantages will become more apparent from a study of the following specification when considered in conjunction with the drawings accompanying the specification, in which:

Figure 1 is a front elevational view with a portion of the front cover broken away, of my measuring and recording apparatus applied to a tension member;

Fig. 2 is a side elevational view of the subject matter shown in Fig. 1 with portions of polish rod broken away for purposes of clarity;

Fig. 3 is a somewhat schematic side view of a derrick, the walking beam associated with the derrick, and the polish rod, being operated by the walking beam shown provided with my measuring and recording device;

Fig. 4 is a side view somewhat schematic of the measuring device as applied to the polish rod shown in Fig. 3;

Fig. 5 illustrates my device operating under compression for measuring the forces in a tension member;

Fig. 6 is a detailed plan view of a pair of beams for mounting the recording pointer;

Fig. 7 is an end view of the subject matter shown in Fig. 6 shown somewhat schematically and in which one of the beams is shown as carrying the pointer;

Fig. 8 is a detailed view of the clamping members of the lower clamp for the polish rod;

Fig. 9 is a sectional view along line IX—IX of Fig. 8 looking in the direction of the arrows;

Fig. 10 shows inserts to twice the scale of the showing in Figs. 8 and 9 that are to be used with the subject matter shown in Figs. 8 and 9.

Fig. 11 is a plan view of the upper clamp member.

Fig. 12 is a sectional view on lines XII—XII of Fig. 11 looking in the direction of the arrows indicated;

Fig. 13 shows inserts to twice the scale of the showing in Figs. 8, 9, 11 and 12 that are to be used with the subject matter shown in Figs. 8, 9, 11 and 12.

Figure 14:
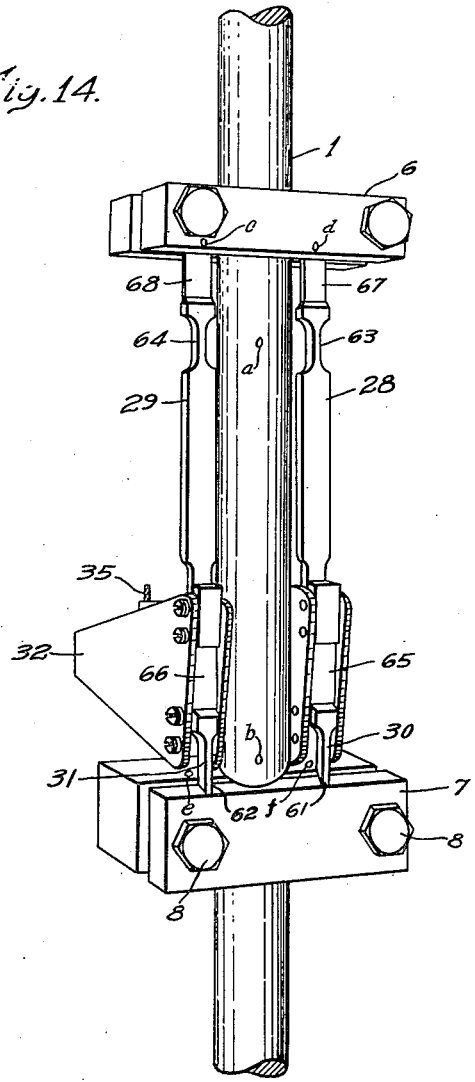
Fig. 14 is a perspective view of a portion at the rear, or polish rod side, of my measuring apparatus.

The reference character 1, referring to Fig. 3, represents the polish rod which is operated in a reciprocatory manner by the walking beam 2 mounted on the Samson post 3 operated by the crank 4 coupled to the pulley 5. The pulley 5 is connected by a suitable belt or rope to some pulley or sheave on the engine shaft placed at some point not shown in Fig. 3.

Generally, my device measures the deformation of a specific length of the polish rod 1 from which the total deformation or stretch may be inferred. To effect such measurement my device is provided with an upper clamping structure 6 and a lower clamping structure 7 disposed a definite distance from the upper clamping structure whereby my device may be rigidly connected to a specific length of the polish rod. I provide the lower clamping structure 7 with a pair of heavy clamping jaws which may be moved toward each other by heavy bolts 8. These clamping jaws are provided with hollowed out portions 9 for receiving special inserts for gripping the polish rod. The upper clamping structure 6 so far as the rod engaging structure is concerned is exactly like the lower clamping structure 7 and has hollowed out portions 10 for receiving inserts such as 12 and 13 shown in Fig. 13 which are of exactly the same structure as corresponding inserts for the lower clamping structure.

The insert 12 is a semi-circular member having an accurate fit in the hollowed out portion 9 whereas the insert 13 has an inside arcuate length less than a semi-circle so that as these inserts are moved toward each other, the rod may be firmly gripped at the rod contacting regions 15 and 16. These regions 15 and 16 comprise the smallest diametrical region of the inserts and, in actual practice, are hardened sufficiently to make the necessary rigid contact with the polish rod. The contact regions 15 and 16 being of the structure shown, therefore, engage the rod over a considerable portion of its circumference but over a relatively small distance in the longitudinal direction of the rod.

The inserts 17 and 18, shown in Fig. 10, are fairly rigid members engaging the diaphragm portions 19 of the lower clamping structure and on their smaller diametrical region engage the polish rod 1. A two point bearing or attachment is thus provided for the instrument at the lower clamping region. Its position therefore may be rather rigid with reference to the polish rod 1.

The upper and lower clamping structures 6 and 7 are connected by columns 21, 22, 23 and 24. The columns are connected to the upper clamping members through a box 25 housing an enlarged portion 26 of the column but so designed with reference to the enlarged portions that there may be some play or looseness so that the recording apparatus of my device can be actuated if there be longitudinal deformation of the polish rod. The recording mechanism is actuated through the struts or tension members 28, 29, 30 and 31. Referring to Figs. 2 and 14 it will be noted that a longitudinal displacement of the upper and lower clamping member by reason of any stretching of the polish rod will actuate the U-shaped member 32 to rotate about an axis perpendicular to the legs of the U-shaped member 32 and disposed somewhere between the tension members or struts 30 and 21 and 28 and 29. A wire 35 is adjustably clamped to the U-shaped member 32 at the mid-portion of the bight thereof by a clamping screw 36 coacting with a channel member 36' and this wire is disposed to operate the pointer 37. The adjustable connection of wire 35 is indirect. Channel member 36' is bolted to the bight of the U-shaped member 32 and wire 35 is adjustably connected to the channel 36'.

At the broken out portion of Fig. 1 and the showings in Figs. 6 and 7 the operation of the pointer is illustrated more clearly.

In Fig. 6, beam 38 represents a structure rigidly connected to the instrument frame whereas beam 39 represents a structure secured to the beam 38 by two pairs of comparatively flat resilient springs. Of these springs reference characters 40 and 41 represent the vertical springs and reference characters 42 and 43 the horizontal springs. The wire 35 is coupled to the beam 39 at a point symmetrical with reference to the springs but disposed a small distance from the line of intersection of the planes defined by the respective springs, namely the wire 35 is disposed a small distance from the axis 45 (see Fig. 7). Any longitudinal movement of the wire 35, therefore, will cause a movement of the pointer, namely, a rotation of the pointer either clockwise or counter-clockwise depending on the longitudinal direction of movement of the wire 35, yet any bending or twisting of the wire itself will not effect the movement of the pointer.

Since Figs. 1 and 7 are front views of my device, it is apparent that pointer 37 is connected to the rear end of beam 39 and its movement will be either counter-clockwise or clockwise about the pivot point, or line, 45 depending on whether the wire 35 moves up or down.

The pointer 37 is disposed to cooperate with a recording sheet 48 mounted on the drum 49 and as the pointer 37 moves over the surface of the drum it will give an indication of the relative displacement of the clamping members 6 and 7.

In order to secure an indication of the stresses in the polish rod 1 for one complete cycle of operation, the drum 49 is coupled through a reduction gear system to a sheave 50 which has a small wire cable 51 wrapped a number of times around it and has one end of the cable connected to the base of the well or derrick as at 52 (see Fig. 3). The vertical movement of the polish rod during the pumping operation thus moves the entire instrument up and down. There usually is some transverse movement, depending upon the arc described by the walking beam and other factors which causes the rod to bend and in the absence of any special provision to eliminate the effect of such bending would normally influence the indications of the instrument.

To secure an indication of the instantaneous velocity of the polish rod as it oscillates up and down and moves the instrument with it, I provide the instrument with an oscillator 100 which is in effect a tuning fork and once manually set into vibration will vibrate with a constant frequency until its vibrations have died down. If repeated records are to be taken, the attendant merely provides the oscillator with small impacts from time to time. This oscillator is rigidly connected to bar 100' which bar is rigidly mounted on two pairs of springs 101 rigidly secured to the bar 101' which bar is part of the instrument frame. On the side adjacent the drum the oscillator carries a pointer 102 which is adapted to coact with the recording sheet 48 on the drum 49. It is thus clear that the oscillator will produce a wave on the drum having a constant frequency and the difference between successive peaks of the wave on the record sheet will be a measure of the instantaneous velocity of the instrument and thus the polish rod in its movement during the measuring operation.

The oscillator is designed to vibrate for an interval of time at least long enough to get one-half of a pumping cycle indicated on the recording sheet 48 by the pointer 37. To give my device an extensive field of application the oscillator 100 is so chosen that its vibrations will continue long enough to take care of the longest half pumping cycle. This choice of an oscillator will, however, in no wise impair its utility for shorter pumping cycles because the amplitudes are of decreasing magnitude and peaks for the first half cycle thus always stand out on the recording sheet regardless of how many other lines, or curves the pointer 102 may draw. If the record sheet is to have a neat appearance which is not necessary, the attendant may stop the oscillator 100, after at least one-half pumping cycle has been recorded, by merely touching it.

The procedure of using my instrument is substantially as follows: After the attendant has determined whether there is enough room between the cross head 53 of the operating link 54 and the upper end of the casing 55, when the walking beam 2 is in the position shown in Fig. 3, he may connect the instrument to the polish rod.

In order to set the instrument without having any portion of the polish rod subjected to a load, a clamp is placed about the rod below the instrument and above the casing head and the rod is allowed to rest upon the casing head. The lower clamping structure 7 of the instrument may then be positioned directly above such clamp and rigidly clamped to the rod and the upper clamping structure may then be clamped to the rod.

A recording sheet as 48 may then be placed on the drum 49 in such a position that the ends of the pointers will be somewhere near the edge of the recording sheet. The cable 51 is then attached to the base at 52, so that its slack is completely taken up. The drum carrying the recording sheet is then rotated through one complete turn by manually pulling on cable 51, or manually operating sheave 50 or drum 49, whereby pointer 37 indicates the zero load line and pointer 102' places a reference line on the sheet. The means for holding the polish rod may then be removed. The instrument is now ready for operation.

The walking beam may, therefore, be set in operation whereupon the drum will be oscillated and the pointer 37 will record the variations in longitudinal dimensions of the polish rod 1 between the rod engaging regions 15 and 16 of the lower and upper clamping members. The pointer 102' is mounted on the frame of the instrument and is merely positioned to draw a line on the recording sheet for purposes of reference. In other words, the varying forces indicated and recorded by the pointer 37 will be determined by the distances of the points of the closed curve described by pointer 37 from the line drawn on the recording sheet by the pointer 102', less the distance of the zero load line from the line drawn by pointer 102'.

To eliminate the possibility of having torsional deformations as well as deflections in a lateral direction of any kind of the polish rod affect the operation of the pointer 37, the struts 28, 29, 30 and 31 are properly positioned and are provided with thin portions or springs 61, 62, 63 and 64 in one plane and other thin portions or springs 65, 66, 67 and 68 in another plane. Assuming that the rod, referring to Fig. 14, is bent in the plane of the thin portions 65, 66, 67 and 68, regardless of the direction. It will be apparent that as one side moves up, the other side will move down a corresponding amount and the position of the U-shaped member will not be affected by reason of the thin portions 61, 62, 63 and 64. That is, such bending will merely tilt the U-shaped member but since the tilting occurs on the axis falling through the connection of the wire 35 to the U-shaped member by the clamping screw 36, the longitudinal movement of the wire 35 will not be affected. This will be explained more in detail presently.

Let "$a$", Fig. 14, represent a point having a fixed relation to the upper clamping member 6, namely being disposed a fixed distance from such clamping structure 6 and let the point be on the center line of the rod when not subject to bending. Let "$b$" represent a point similarly disposed with reference to the lower clamping member 7. Let points "$c$" and "$d$" be equi-distant from "$a$" and let points "$e$" and "$f$" have the same relation to point "$b$". Further, let it be assumed all these points fall in the same plane passing through the longitudinal axis of the rod 1 when not subjected to any bending. My apparatus is so constructed that the axes of struts 28 and 29 normally fall in the plane passing through the longitudinal axis of the rod. For convenience in discussing my apparatus let the points "$a$", "$b$", "$c$", "$d$", "$e$" and "$f$" be considered as also falling in the plane including the axes of rod 1 and the struts 28 and 29.

Any bending of the rod, in the plane assumed, about a center falling to the right of the rod 1 will cause points "$d$" and "$f$" to approach each other and will cause points "$c$" and "$e$" to recede from each other. This change in relative disposition of points "$c$" and "$e$", or "$f$" and "$d$" may be expressed in the form (1) $\qquad X = A\theta + B\theta^2 + C\theta^3 + \text{etc.}$ Where A, B, C, etc. are constants and $\theta$ is the angle between the plane defined by 15 and 16 of clamp 6 and the plane defined by 15 and 16 of clamp 7 in the plane of the bending assumed.

Let $X_1$ = the change in distance between "$d$" and "$f$", then (2) $\qquad X_1 = A_1\theta + B_1\theta^2 + C_1\theta^3 + \text{etc.}$ For the change in distance between the points "$c$" and "$e$" the equation for such change in distance will be similar to (2) except that the sign of $\theta$ should be changed. The equation is, therefore, (3) $\qquad X_2 = -A_2\theta + B_2\theta^2 - C_2\theta^3 + \text{etc.}$ In both equations the factors including the third order and over are extremely small and may be disregarded.

Adding (2) and (3) and disregarding the terms of the third order and over, I get (4) $\qquad X_1 + X_2 = (A_1 - A_2)\theta + (B_1 + B_2)\theta^2$ But (5) $\qquad \dfrac{X_1 + X_2}{2} = X_0 =$ the change in distance between points "$a$" and "$b$". Therefore, (6) $\qquad 2X_0 = (A_1 - A_2)\theta + (B_1 + B_2)\theta^2$ It may be shown that to make an instrument independent of bending when there is no stretching, $$X_1 + X_2 = 2X_0 = 0$$

Since points "$c$" and "$d$" are equi-distant from "$a$" and points "$e$" and "$f$" are equi-distant from "$b$" it may be readily demonstrated that the terms of the first order, namely $(A_1 - A_2)\theta$ will equal 0. This means that (7) $\qquad 2X_0 = 0 + \theta^2 (B_1 + B_2)$ (8) The problem is to make $$2X_0 = 0 = \theta^2 (B_1 + B_2)$$

During bending the axis of the rod will describe an arc and in consequence corresponding points on the axis in the planes defined by 15 and 16 of the upper and lower clamping structures will move toward each other. Similarly points "$a$" and "$b$" will move toward each other unless care is taken in selecting the distances of these points from the clamping planes. Once these distances of points "$a$" and "$b$" have been determined then the requirements of Equation 8 are satisfied.

I have found that for all bending up to five or even six times the bending that actually occurs in polish rods, it is substantially correct to place "$a$" and "$b$" at such points that the sum of their normal distances from the planes of 15 and 16 of the upper and lower clamping structures should be equal to one-third the normal distance on the axis of the rod between the planes defined by the clamping regions of 6 and 7.

A study of Fig. 14 will show that the mid-portions of regions 61 and 62, and 63 and 64, and 65 and 66, and 67 and 68 satisfy the requirement for the disposition of points "a" and "b". In other words the movement of the point of connection of wire 35 is made a function of the relative displacement of points "a" and "b". Bending of the rod I thus does not affect the movement of lever 32.

Practically small adjustments of the attachment of wire 35 at the front of lever 32 can be made to take care of any errors of construction. As shown in Fig. 2 the attachment of wire 35 to lever 32 may be shifted vertically and also horizontally so that pointer 37 will indicate and record $X_m$, namely the relative displacement of points "a" and "b" as a result of stretching only.

The total relative displacement of "a" and "b" namely $$X_t = X_m + \frac{X_1 + X_2}{2}$$

But as I have shown $$\frac{X_1 + X_2}{2}$$

can be made equal to zero so that the total deflection $X_t$ is equal to $X_m$.

To eliminate the effect of bending in a plane at right angles to the plane of bending hereinbefore assumed the thinned portions 67 and 68 are so positioned that they are aligned and define a plane that also includes the center line of the rod I. Bending in such plane at right angles to the plane of bending hereinbefore assumed will not affect struts 28 and 29 differently. The term of the first order in Equation 4 is thus equal to zero. The second order effect is, of course, eliminated by properly selecting the distance of 67 and 68 and 65 and 66 from the respective clamping structures.

Various electrical devices have been known by means of which an effort was made to secure the loads in a tension member. However, such devices are usually delicate in structure, require a special source of electrical energy and are not adapted for handling by unskilled labor. With my device less skill is necessary and the record may be taken by any one having a fair degree of mechanical ingenuity. Furthermore, all the structure devised is built of rather strong material and yet the actuating elements are so designed as not to be affected by the distortions or deformations of the polish rod or the twisting of the polish rod.

Furthermore, my invention does not include any delicate structure and yet is very sensitive. For instance, the relative movement of the upper and lower clamping members produce mechanical multiplication of 1 to 10 at the U-shaped member, whereas the multiplication of the movement of the wire 35 to the recording point of the pointer comprises a multiplication of 1 to 40. There is thus a total multiplication of 1 to 400 in the operation of the recording pointer. Extremely small deformations can therefore be recorded by the pointer 37 and by the structure I have devised, no errors introduced by reason of lost motion and the accuracy of the ratio of multiplication is therefore maintained through the life of the instrument in accordance with its original design. The ratio of multiplication is, of course, a relatve matter and can be changed, depending upon operating conditions for which my instrument is to be used.

My device is not limited to the cases where the attendant finds there is sufficient room between the cross head 53 and the casing head 55. If there is not enough room, which may often happen in the field, he can readily position my instrument above the cross head, as shown in Fig. 5. In this case the base of the instrument is positioned on the cross head 53 and the rod clamping structure normally used with the cross head 53 is positioned above the upper clamping structure 6. The columns 21, 22, 23 and 24 now act as compression members and since the elastic characteristics of these columns are known, the stress in the polish rod may be indicated as readily with my instrument when positioned as shown in Fig. 5 as it does indicate the stresses in the polish rod when connected as shown in Figs. 3 and 4.

I am of course aware that others, particularly after having had the benefit of the teachings of my invention could devise other stress indicators and recorders for accomplishing substantially the same results I accomplish with my device. I, therefore, do not wish to be limited to the particular showing herein made but wish to be limited only by the scope of the appended claims and the pertinent prior art.

I claim as my invention:

1. In a tension indicating device of the class described, a pair of clamping members adapted to clamp a predetermined length of the tension member, the stress of which is to be determined, two pairs of flexible operating struts symmetrically disposed with reference to the tension member connected to the clamping members, said struts having flexibility in two directions and yet being designed to be rigid in a third direction so that each may operate like a rigid member, a pointer actuating member connected respectively to the pairs of struts and adapted to operate an indicating pointer proportional to the relative movement of said clamping members.

2. A force measuring device for use with a tension member the deformations of which are to be determined by reason of the forces acting thereon, said device comprising a pair of clamps disposed to clamp a predetermined length of the tension member, a system of struts, connected to the clamps, disposed symmetrically with reference to the tension member so that any bending of the tension member will cause the struts disposed on opposite sides of the tension member to move in opposite directions, and an indicating member having interconnecting means with the struts adapted to be operated by the struts for indicating the force acting on said tension member but being uninfluenced by the bending or torsional deformation of the tension member.

3. A force measuring device for measuring the force acting on a member, in combination, means for gripping the member at points a specified distance apart, laterally resilient struts, connected to the gripping means, disposed at each side of the member, a floating lever so attached to the struts that there is a region on the lever that moves only upon relative movement longitudinally of the member of the means for gripping the member, a measuring indicator secured to the lever at the said region on the lever that moves only upon relative movement longitudinally of the member of the means for gripping the member to thus indicate the variations in force acting on the member longitudinally of the member, and means associated with the measuring indicator for recording the magnitudes of the forces acting on said member.

4. In a device for determining small increments in length of a member being acted upon by varying forces acting longitudinally of the member, in combination, a pair of laterally resilient struts connected to the member at opposite sides of the member so that any bending or twisting of the member will affect the struts equally and oppositely but any movement of the point of connection with reference to a given point in the longitudinal axis of the member and at a given distance from the said connection is indicated by movement of the free ends of the struts longitudinally of the axis of the member, and measuring means responsive to such longitudinal movement of the free ends of the struts adapted to determine the varying forces acting on the member.

5. In a device for determining small increments in length of a member being acted upon by varying forces acting longitudinally of the member, in combination, a pair of laterally resilient struts connected to the member at opposite sides of the member so that any bending or twisting of the member will affect the struts equally and oppositely, a second pair of laterally resilient struts connected to the member at a point on the member a specified distance from the connection of the first pair of struts, and connected on opposite sides of the member so that any bending or twisting of the member will also affect the struts of the second pair equally and oppositely, whereby the relative movement of the free ends of the struts longitudinally of the axis of the member is not affected, and means responsive to the relative movement of the free ends of the struts longitudinally of the member for measuring the forces acting on the member.

6. In a device for determining small increments in length of a member being acted upon by varying forces acting longitudinally of the member, in combination, a pair of laterally resilient struts connected to the member at opposite sides of the member so that any bending or twisting of the member will affect the struts equally and oppositely whereby the mid-point of the line connecting the free ends of the struts will not by reason of such bending or twisting move longitudinally of the member, a second pair of laterally resilient struts connected to the member at opposite sides of the member at a specified distance from the connection of the first pair of members so that any bending or twisting of the member will also affect the struts equally and oppositely, so that the mid-point of the line joining the free ends of this second pair of struts does not, by reason of such bending and twisting of the member move longitudinally of the member, a floating lever interconnecting the free ends of the first pair of struts with the free ends of the second pair of struts, and indicating means connected to the floating lever at such a point that its operation is responsive only to the relative displacement longitudinally of the member at the connections of the struts.

7. In a device for determining small increments in length of a member being acted upon by varying forces acting longitudinally of the member, in combination, a pair of laterally resilient struts connected to the member at opposite sides of the member so that any bending or twisting of the member will affect the struts equally and oppositely, a second pair of laterally resilient struts connected to the member a specified distance from the connection of the first pair of struts and at opposite sides of the member so that any bending or twisting of the member will affect the struts of the second pair equally and oppositely, said pairs of struts being so connected to the member that the free ends thereof are disposed toward each other, an irregularly shaped floating lever connected to the free ends of the struts, and means connected to the floating lever at the point on the lever that is responsive to the relative displacement of the connections of the struts along the axis of the member, and recording means responsive to the means connected to the floating lever.

8. In a device for determining small increments in length of a member being acted upon by varying forces acting longitudinally of the member, in combination, a pair of laterally resilient struts connected to the member at opposite sides of the member so that any bending or twisting of the member will affect the struts equally and oppositely, a second pair of laterally resilient struts connected to the member at opposite sides of the member so that any bending or twisting of the member would also affect these struts equally and oppositely, said second pair of struts being connected to the member a specified distance from the connection of the first pair of struts to the member and the struts having their free ends extending toward the free ends of the first pair of struts, a floating lever connected to the free ends of the struts but bent in such a shape as not to interfere with the member, means connected to the floating lever at a point on the lever that is responsive to the relative movement longitudinally of the axis of the member of the connections of the struts to the member, mechanical multiplying means for multiplying the movement of the means connected to the point on the floating lever specified and means coacting with said multiplying means for recording the magnitudes of the relative displacement in the longitudinal axis of the member of the connections of the struts.

9. In a device for determining small increments in length of a polish rod for a deep well pump being acted upon by varying forces acting longitudinally of the polish rod during a pumping cycle, in combination, a pair of laterally resilient struts connected to the rod at opposite sides of the polish rod so that any bending or twisting of the rod will affect the struts equally and oppositely but any movement of the point of connection with reference to a given point on the longitudinal axis of the polish rod and at a given distance from the said connection is indicated by a movement of the free ends of the struts longitudinally of the axis of the polish rod, means responsive to such longitudinal movement of the free ends of the struts with reference to said given point on the longitudinal axis of the polish rod adapted to determine the varying forces acting on the polish rod during one pumping cycle, and means responsive to the oscillatory movement of the polish rod during a pumping cycle for moving a recording sheet adjacent said measuring means to record the measurements determined by said measuring means.

JOHN G. BAKER.